(12) United States Patent
Zhu (10) Patent No.: US 12,119,717 B1
(45) Date of Patent: Oct. 15, 2024

(54) CONTROL CIRCUIT FOR FAN

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 18/533,880

(22) Filed: Dec. 8, 2023

(30) Foreign Application Priority Data

Nov. 9, 2023  (CN) .......................... 202323036568.2

(51) Int. Cl.
| | | |
|---|---|---|
| *H02K 11/33* | (2016.01) | |
| *H02K 7/14* | (2006.01) | |
| *H02K 11/00* | (2016.01) | |
| *H02P 5/68* | (2006.01) | |
| *H02P 7/28* | (2016.01) | |

(52) U.S. Cl.
CPC ............... *H02K 11/33* (2016.01); *H02K 7/14* (2013.01); *H02K 11/0094* (2013.01); *H02P 5/68* (2013.01); *H02P 7/28* (2013.01); *H02K 2211/00* (2013.01)

(58) Field of Classification Search
CPC ...... H02K 11/33; H02K 7/14; H02K 11/0094; H02K 2211/00; H02P 5/68; H02P 7/28
See application file for complete search history.

(56) References Cited

U.S. PATENT DOCUMENTS

| | | | |
|---|---|---|---|
| 8,241,011 B2* | 8/2012 | Huang ................. | F04D 19/024 417/244 |
| 2009/0228147 A1* | 9/2009 | Lim ....................... | F24F 11/30 700/275 |
| 2018/0209433 A1* | 7/2018 | Sun ....................... | F04D 25/06 |
| 2022/0142327 A1* | 5/2022 | Lei ........................ | A45D 20/12 |
| 2022/0246027 A1* | 8/2022 | Lee ....................... | G08C 17/02 |
| 2022/0252078 A1* | 8/2022 | Tsao ...................... | F04D 25/16 |
| 2023/0243368 A1* | 8/2023 | Zhu ..................... | F04D 25/0693 415/213.1 |

\* cited by examiner

*Primary Examiner* — Zoheb S Imtiaz (57) ABSTRACT

The present disclosure provides a control circuit for a fan. The control circuit for a fan including a fan head equipped with a first motor and fan blades connected to the first motor. The control circuit includes an MCU, a stepless regulation circuit and a first driving circuit both connected to the MCU. The stepless regulation circuit includes a stepless regulator for user operation. The first driving circuit is also electrically connected to the first motor, the stepless regulation circuit sends back corresponding electrical signals to the MCU based on user operation of the stepless regulator, and the MCU controls the power output of the first driving circuit to the first motor based on the electrical signal feedback from the stepless regulation circuit, which adjusts the power output to the first motor to adjust the speed of fan blades.

15 Claims, 10 Drawing Sheets

CONTROL CIRCUIT FOR FAN

CROSS-REFERENCE TO RELATED APPLICATIONS

The application claims priority of Chinese patent application CN2023230365682, filed on 9 Nov. 2023, which is incorporated herein by reference in its entireties.

TECHNICAL FIELD

The present disclosure relates to the technical field of fans, in particular, to a control circuit for a fan.

BACKGROUND

As is well known, fans are devices used for cooling. Currently, existing fans typically adjust airflow by using button controls with three speed settings: low, medium, and high. With fixed speed levels, this mode of operation does not allow for free adjustment of airflow, which affects the users' experience.

SUMMARY

A main objective of the present disclosure is to provide a control circuit for a fan, in order to solve the problem of existing fans being unable to adjust the speed of the airflow freely.

In order to solve the technical problem, the technical scheme provided by the present disclosure is as follows.

A control circuit for a fan, the fan including a fan head equipped with a first motor and fan blades connected to the first motor, wherein the control circuit includes an MCU, a stepless regulation circuit and a first driving circuit both connected to the MCU; the stepless regulation circuit includes a stepless regulator for user operation, the first driving circuit is also electrically connected to the first motor, the stepless regulation circuit is configured to send back corresponding electrical signals to the MCU based on the user operation provided on the stepless regulator, and the MCU is configured to control a power output of the first driving circuit to the first motor based on the electrical signal from the stepless regulation circuit.

Further, the stepless regulator is a potentiometer or a rotary encoder switch.

Further, the control circuit further includes a power module electrically connected to the MCU, the first driving circuit, and the stepless regulation circuit.

Further, the fan further includes a second motor for controlling a rotation of the fan head, the control circuit including a second driving circuit and a first switch electrically connected to the MCU; the second driving circuit is electrically connected to the power module and the second motor, respectively; the MCU is configured to drive the second motor to work through the second driving circuit based on the electrical signal from the first switch.

Further, the first driving circuit includes a first switching tube and a first interface, the first interface is connected to the first motor; a gate of the first switching tube is connected to the MCU, a source of the first switching tube is grounded; a drain of the first switch is connected to a negative pole of the first motor through the first interface, and an output end of the power module is connected to a positive pole of the first motor through the first interface.

Further, the first driving circuit further includes a first filtering unit, wherein the first filtering unit includes a first inductor, a first diode, and a filtering capacitor; an output end of the power module is sequentially connected to a positive pole of the first motor through the first interface after passing through the first inductor and the first diode; one end of the filtering capacitor is grounded, and the other end is connected to an output terminal of the first diode and the first interface, respectively.

Further, when the stepless regulator is an encoder, the first driving circuit includes a boost chip, a first resistor, a second resistor, a first capacitor, and a regulating resistor; a SW pin of the boost chip is connected to an output end of the first inductor, an enable pin of the boost chip is electrically connected to the MCU; a feedback pin of the boost chip is connected to the output end of the first diode through the first resistor, one end of the second resistor is grounded, and the other end is connected to a feedback pin of the boost chip; an input power pin of the boost chip is grounded through the first capacitor and also electrically connected to the output end of the first diode; the regulating resistor includes multiple parallel third resistors, wherein one end of the third resistor is connected to the feedback pin of the boost chip, and the other end is connected to an output pin of the MCU; the boost chip receives an electrical signal output by the MCU through an enable pin and works according to the electrical signal; the MCU is configured to select several third resistors to be electrically connected to the boost chip based on a feedback signal from the stepless regulator; the boost chip is configured to adjust a voltage output to the first interface based on the electrical signal input from the feedback pin.

Further, the number of the third resistor is 12.

Further, the second driving circuit includes a motor driving chip, a first filtering unit, a second filtering unit, and a second interface; the first filtering unit is electrically connected to an output end of the power circuit and the motor driving chip, and the first filtering unit is configured to filter the voltage output from the power circuit before supplying it to the motor driving chip; the second filtering unit is electrically connected to the motor driving chip and the second interface, and the second interface is connected to the second motor; the second filtering unit is configured to filter the driving voltage output from the motor driving chip before supplying it to the second motor; the sixth and seventh pins of the motor driving chip are grounded, and SDA and SCK pins of the motor driving chip are electrically connected to the MCU.

Further, the first filtering unit includes a fourth resistor, a second capacitor, and a second diode; an output end of the power circuit is connected to a fourth pin of the motor driving chip through the fourth resistor, and the fourth pin of the motor driving chip is also grounded through the second capacitor; the positive pole of the second diode is grounded, while the negative pole is electrically connected to the fourth pin of the motor driving chip.

Further, the second filtering unit includes a third capacitor, one end of the third capacitor is electrically connected to both a second interface and a eighth pin of the motor driving chip, while its other end is connected to both the second interface and the fifth pin of the motor driving chip.

Further, the encoder is a press switch encoder, and the first switch is the switch on the press switch encoder.

Further, the power module includes a power input interface and a power circuit electrically connected to the power input interface; the power circuit is electrically connected to the MCU, the first driving circuit, the second driving circuit, and the stepless regulation circuit.

Further, the power module further includes a battery electrically connected to the power circuit; the power circuit is a charging and discharging circuit used for charging the battery with a power input from a power interface.

Further, the power module further includes a battery protection circuit electrically connected to both the power circuit and the battery; the battery protection circuit is configured to stop charging the battery during overcharging and prevents the battery from continuing to output voltage during excessive discharge.

Further, the control circuit further includes a power indication circuit electrically connected to the MCU; the power circuit provides a feedback signal to the MCU when the power is connected to the power interface, and the MCU controls the power indication circuit based on the feedback signal from the power circuit.

Further, the power circuit includes a charging and discharging chip, a fifth resistor, a fourth capacitor, and a fifth capacitor; the second pin of the charging and discharging chip is grounded through the fifth resistor, the fourth pin of the charging and discharging chip is grounded through the fourth capacitor, and the fifth pin of the charging and discharging chip is grounded through the fifth capacitor; the positive pole of the battery is electrically connected to the fifth pin of the charging and discharging chip, and the seventh pin of the charging and discharging chip is connected to the MCU for temperature monitoring of MCU.

Further, the battery protection circuit includes a battery protection chip, a sixth capacitor, and a sixth resistor, a first pin of the battery protection chip is connected to the third pin of the battery protection chip through the six resistor, and the third pin of the battery protection chip is connected to the fifth pin of the charging and discharging chip through the sixth resistor; the second pin of the battery protection chip is connected to its first pin, and this second pin is also connected to the negative pole of the battery; the fourth and fifth pins of the battery protection chip are grounded.

Further, the power interface is a Type-C interface.

Further, the control circuit for a fan according to claim 19, wherein the MCU is a model AD156B chip.

Compared with the prior art, the present disclosure has the beneficial effects below: This embodiment can be operated for users by configuring the stepless regulator in the control circuit. When operating the stepless regulator, the stepless regulation circuit provides timely feedback signals to MCU. Based on the feedback signals from the stepless regulation circuit, MCU adjusts the power output to the first interface through the first driving circuit, which adjusts the power output to the first motor to adjust the speed of fan blades. Thus, users can adjust the airflow speed of fan blades according to their needs, solving the problem of existing fans not being able to freely adjust the airflow speed, improving operational performance and users' experience.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIGS. 1-9, a control circuit for a fan in an embodiment of the present invention.

Figure 1:
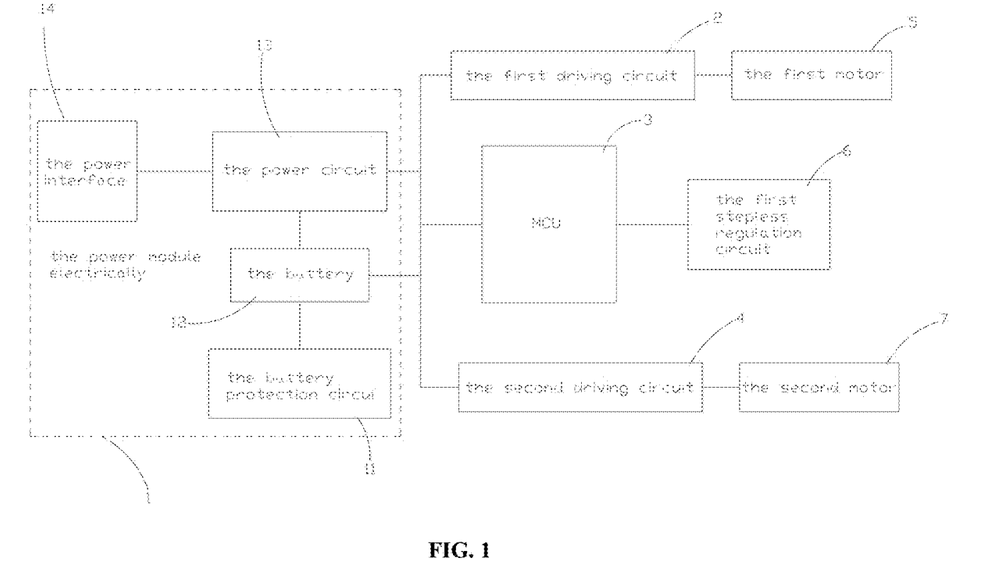
FIG. 1 is a block diagram of a control circuit of the present disclosure.
Figure 8:
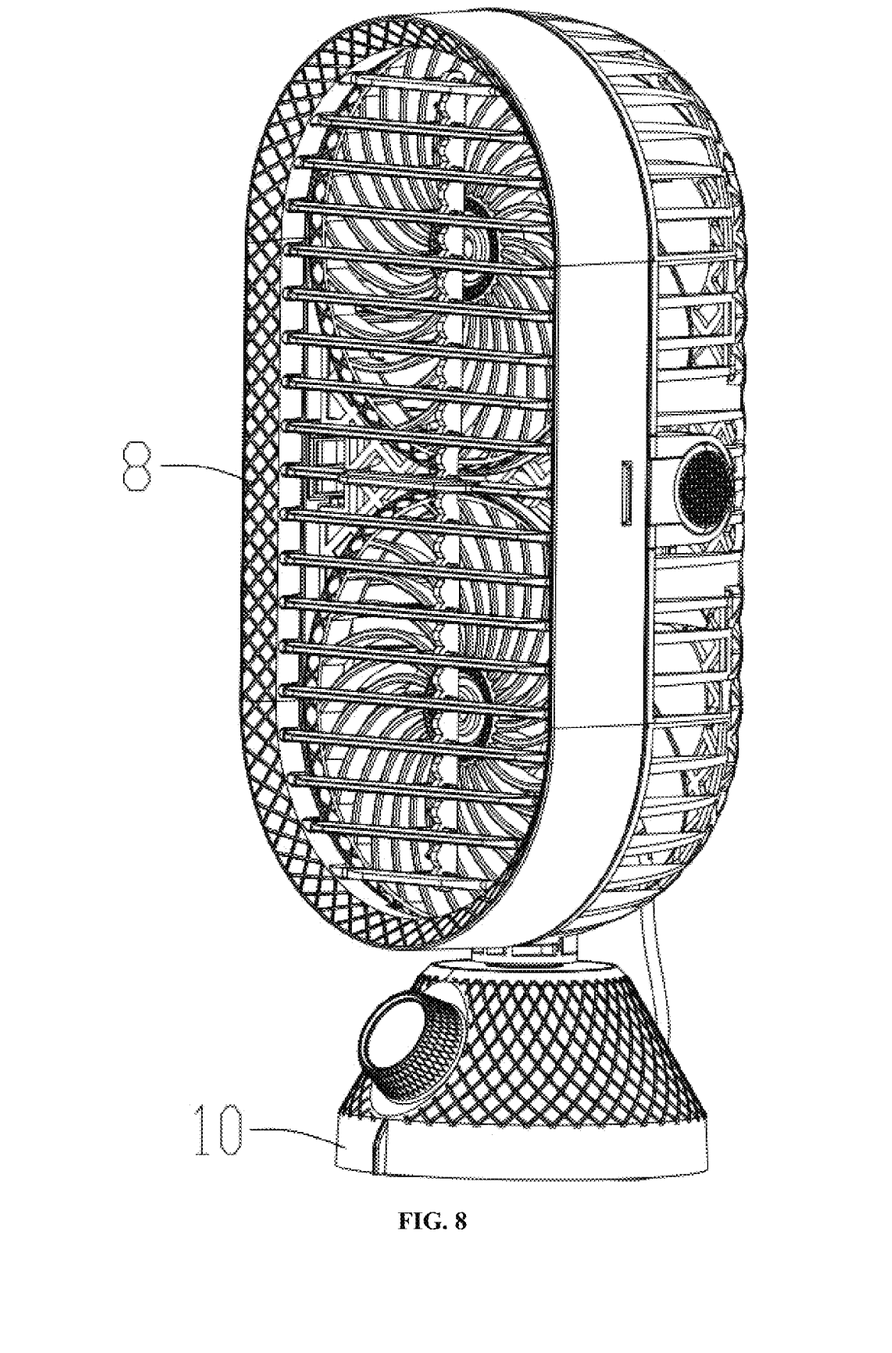
FIG. 8 is a three-dimensional diagram of a fan of the present disclosure.
Figure 9:
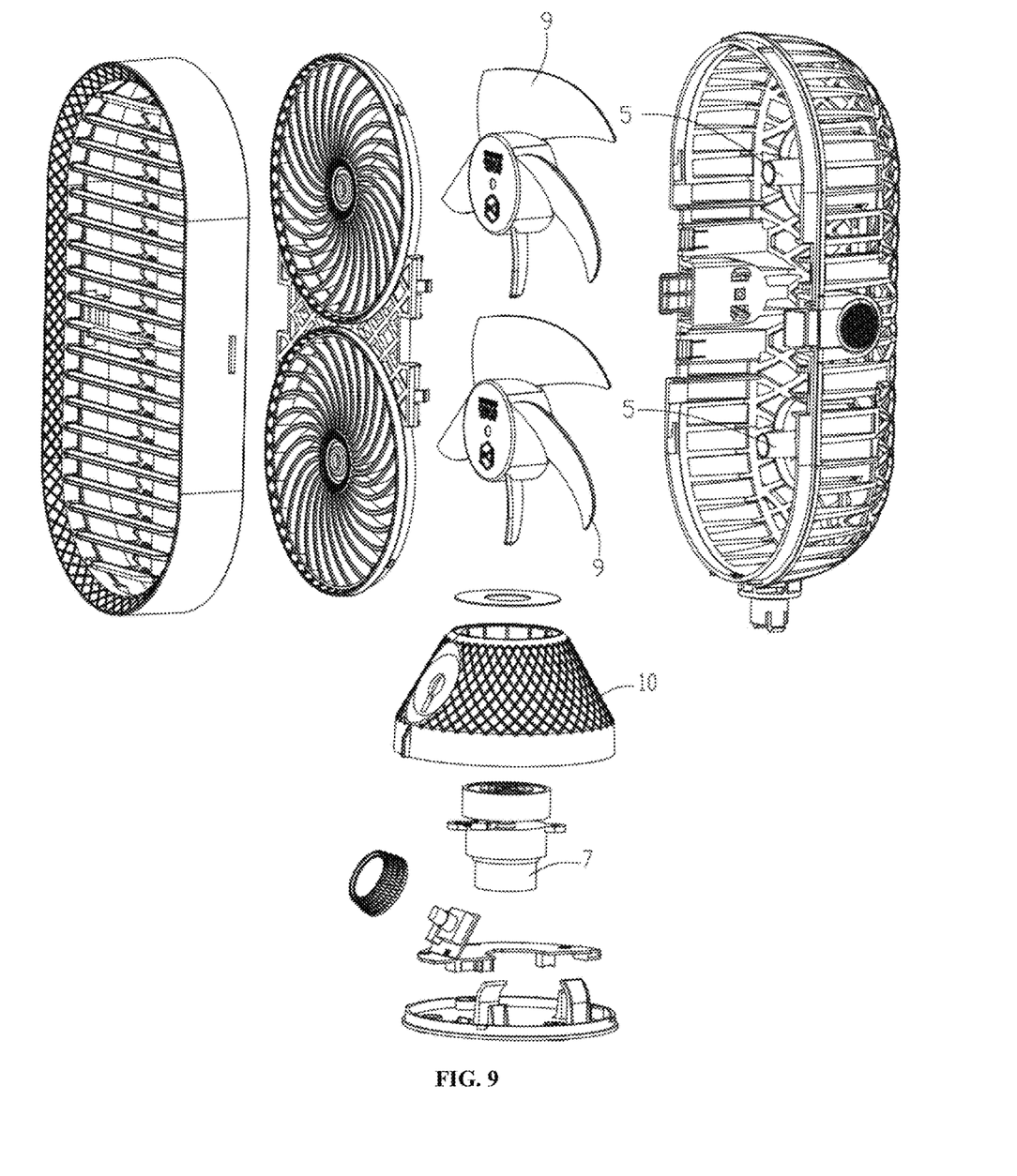
FIG. 9 is an exploded view of the fan of the present disclosure.

In this embodiment, the fan includes a fan head 8, on which a first motor 5 and fan blades 9 connected to the first motor 5 are located. The control circuit includes an MCU 3, a stepless regulation circuit 6 and a first driving circuit 2 both electrically connected to the MCU 3. The stepless regulation circuit 6 includes a stepless regulator J8 for user operation. The first driving circuit 2 is also electrically connected to the first motor 5. The stepless regulation circuit 6 provides corresponding electrical signals to the MCU 3 based on the user's operation of the stepless regulator J8. The MCU 3 controls the power outputted to the first motor 5 from the first driving circuit 2 based on the electrical signals feedback from the stepless regulation circuit 6.

This embodiment can be operated for users by configuring the stepless regulator J8 in the control circuit. When operating the stepless regulator J8, the stepless regulation circuit 6 provides timely feedback signals to MCU 3. Based on the feedback signals from the stepless regulation circuit 6, MCU 3 adjusts the power output to the first interface J4 through the first driving circuit 2, which adjusts the power output to the first motor 5 to adjust the speed of fan blades 9. Thus, users can adjust the airflow speed of fan blades 9 according to their needs, solving the problem of existing fans not being able to freely adjust the airflow speed, improving operational performance and users' experience.

Figure 7:
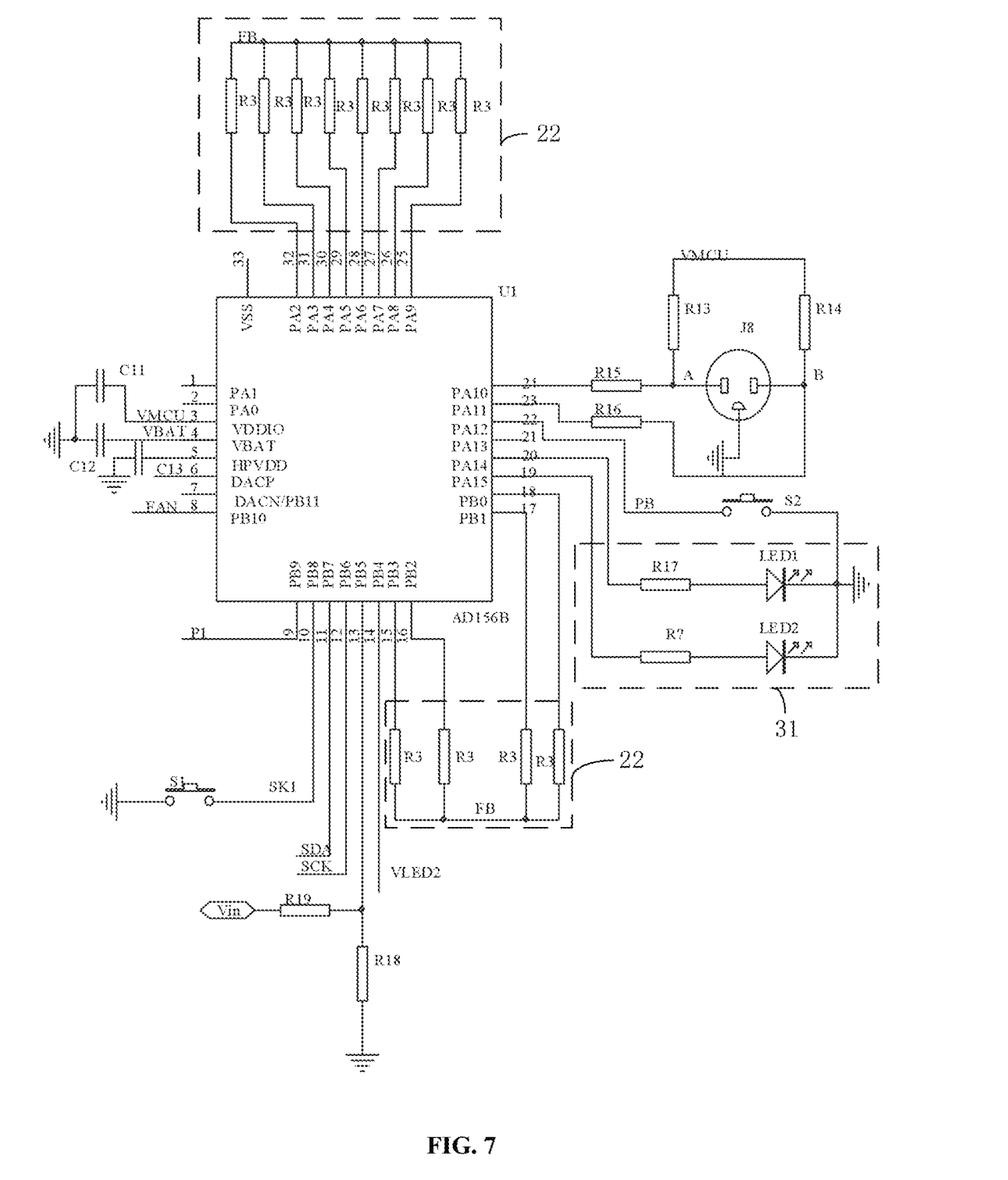
FIG. 7 is a circuit diagram of a connection between a MCU of the present disclosure and the power indicator circuit, the stepless regulation circuit, and the adjustment circuit.

Specifically, the stepless regulator J8 is either a potentiometer or a rotary coding switch. When the stepless regulator J8 is a potentiometer, the rotating operating component can adjust the resistance of the potentiometer, and the circuit board adjusts the power output to the first motor 5 based on the change of the resistance. When the stepless regulator J8 is a rotary coding switch, the rotating operating component can adjust the rotary coding switch. At this time, the output end of the encoder will provide a phase difference feedback to the circuit board, and the circuit board will adjust the power output to the first motor 5 based on this phase difference, effectively solving the problem of limited airflow speed range for existing fans and meeting the user's demand for free adjustment of airflow speed.

In the above embodiment, the control circuit also includes a power module 1 electrically connected to MCU 3, the first driving circuit 2, and the stepless regulation circuit 6, respectively. The power module 1 supplies power to MCU 3, the first driving circuit 2, and the stepless regulation circuit 6 to enable the entire control circuit on power and work.

In one embodiment, the fan further includes a second motor 7 controlling the rotation of the fan head 8, and the control circuit includes a second driving circuit 4 and a first switch S2 both electrically connected to MCU 3. The second driving circuit 4 is electrically connected to the power module 1 and the second motor 7 respectively. MCU 3 drives the second motor 7 to work through the second driving circuit 4 based on the electrical signal feedback from the first switch S2 to achieve the shaking of fan blades 9.

Specifically, in this embodiment, the fan further includes a base 10, and the second motor 7 can be mounted on the base 10, with its rotating shaft connected to the fan head 8; alternatively, the second motor 7 can be installed on the fan head 8, with its rotating shaft connected to the base 10. When the second motor 7 is in operation, it uses a reaction force to drive the fan head 8 to shake its head.

Figure 2:
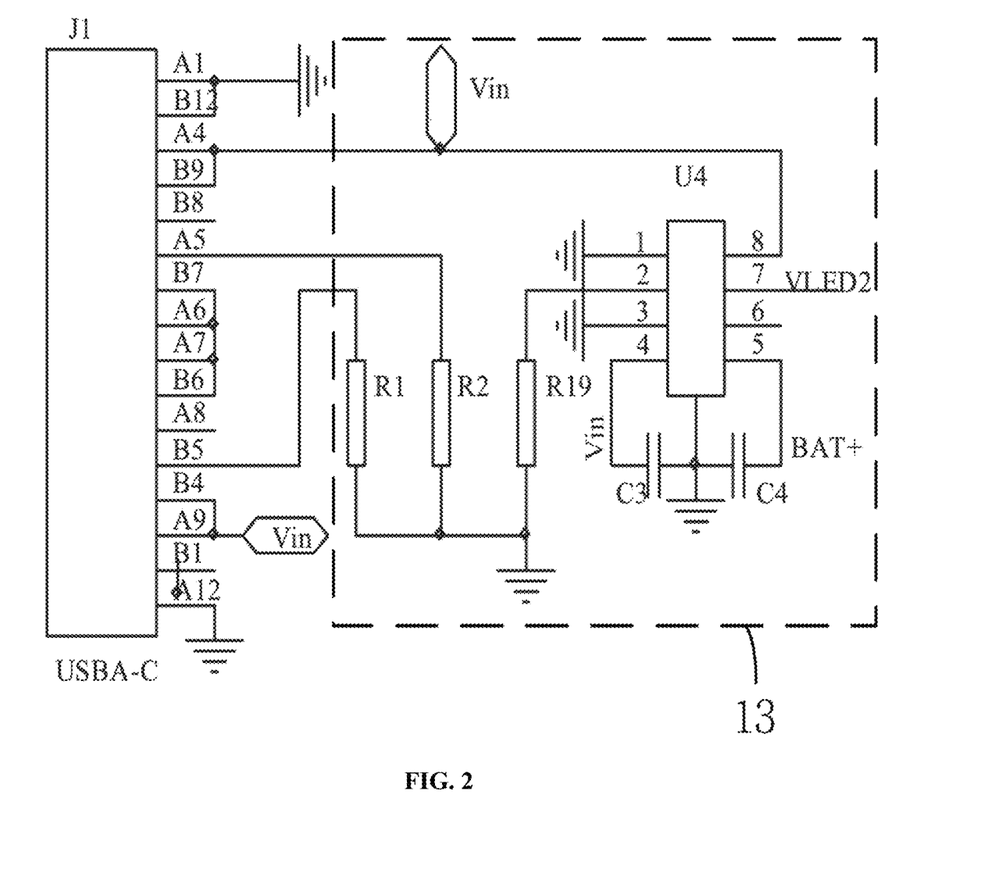
FIG. 2 is a circuit diagram of a connection between a power circuit and a power interface of the present disclosure.

Specifically, the power module 1 includes a power interface 14 for accessing power and a power circuit 13 electrically connected to the power interface 14. The power circuit 13 is respectively electrically connected to MCU 3, the first driving circuit 2, the second driving circuit 4, and the stepless regulation circuit 6, thus to process the power input from the power interface 14 and supply power to MCU 3, the first driving circuit 2, the second driving circuit 4, and the stepless regulation circuit 6.

Figure 4:
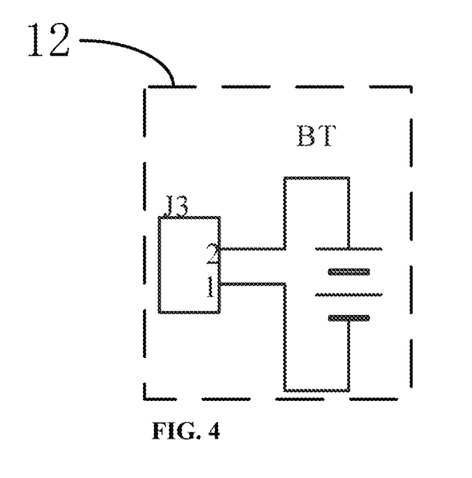
FIG. 4 is a circuit diagram of a battery of the present disclosure.

In one embodiment, the power module 1 further includes a battery 12 electrically connected to the power circuit 13, which is a charging and discharging circuit used to charge the battery 12 through the power input from the power interface 14. The charging and discharging of the battery 12 can be achieved by using power circuit 13.

Figure 3:
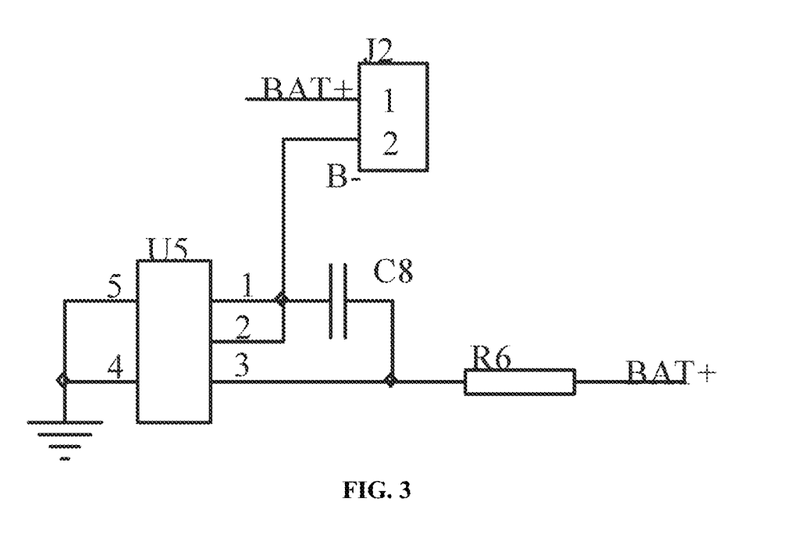
FIG. 3 is a circuit diagram of a battery protection circuit of the present disclosure.

In one embodiment, the power module 1 further includes a battery protection circuit 11 that is electrically connected to the power circuit 13 and the battery 12, respectively. The battery protection circuit 11 stops charging the battery 12 when the battery 12 is overcharged and stops the battery 12 from continuing to output voltage when the battery 12 is over discharged, thus to protect the battery 12 from shortening its life span under the circumstances of overcharging or over discharging.

In one embodiment, the control circuit further includes a power indicator circuit 31 connected to MCU 3, and the power circuit 13 provides feedback signals to MCU 3 when connected to the power interface 14. MCU 3 controls the power indicator circuit 31 to give instructions based on the feedback signals from the power circuit 13, reminding users that the fan is powered on normally, etc.

Specifically, the power circuit 13 includes a charging and discharging chip U4, a fifth resistor R1, a fourth capacitor C3, and a fifth capacitor C4. The second pin of the charging and discharging chip U4 is grounded through the fifth resistor R1, the fourth pin of the charging and discharging chip U4 is grounded through the fourth capacitor C3, the fifth pin of the charging and discharging chip U4 is grounded through the fifth capacitor C4, the positive pole of the battery 12 is electrically connected to the fifth pin of the charging and discharging chip U4, and the seventh pin of the charging and discharging chip U4 is electrically connected to MCU 3 to detect the temperature of MCU 3. Among them, the power interface 14 is a Type-c interface, and the charging and discharging chip U4 is a 4056 model chip, specifically TP4056, AXS4056, etc, to realize the charging and discharging of the battery 12.

The battery protection circuit 11 includes a battery protection chip U5, a sixth capacitor C8, and a sixth resistor R6. The first pin of the battery protection chip U5 is connected to the third pin of the battery protection chip U5 through the sixth capacitor C8. The third pin of the battery protection chip U5 is connected to the fifth pin of the charging and discharging chip U4 through the sixth resistor R6, and the second pin of the battery protection chip U5 is connected to its own first pin, the second pin of the battery protection chip U5 is connected to the negative pole of the battery 12, and both the fourth and fifth pins of the battery protection chip U5 are grounded. Among them, the battery protection chip U5 can be a chip of model 5352.

Figure 5:
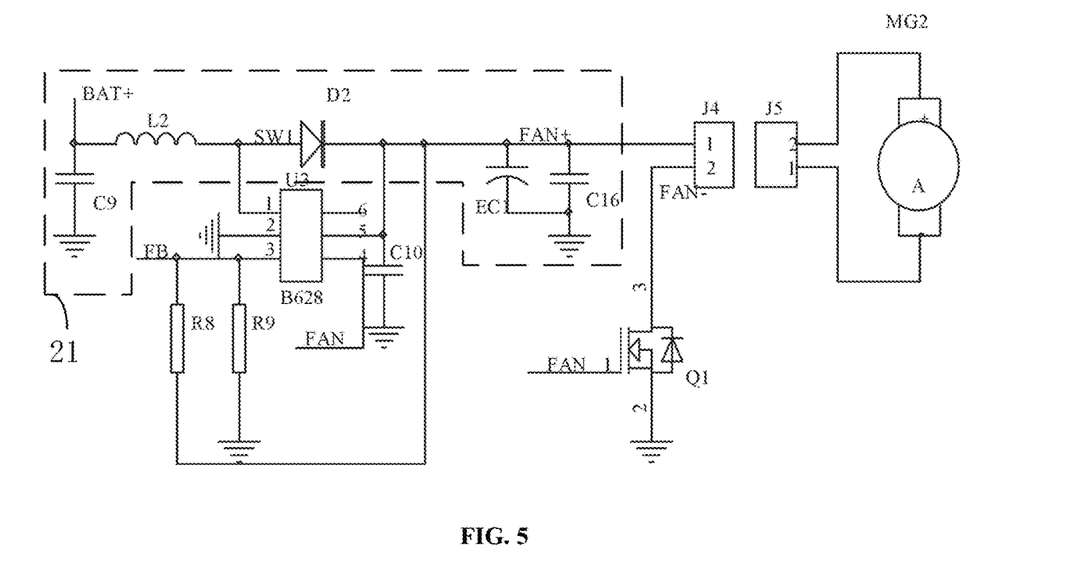
FIG. 5 is a partial circuit diagram of a first driving circuit of the present disclosure.

The first driving circuit 2 includes a first switching tube Q1 and a first interface J4. The first interface J4 is connected to the first motor 5. The gate of the first switching tube Q1 is connected to MCU 3, the source of the first switching tube Q1 is grounded, the drain of the first switch is connected to the negative pole of the first motor 5 through the first interface J4. The output end of the power module 1 is connected to the positive pole of the first motor 5 through the first interface J4. When the user turns on the fan through the stepless regulator J8, MCU3 sends a conduction signal to the first switching tube Q1 based on the feedback signal from the stepless regulator J8, in order to achieve the opening and closing of the first motor 5 through the first switching tube Q1.

The first driving circuit 2 also includes a first filtering unit 21, which includes a first inductor L2, a first diode D2, and a filtering capacitor C16. The output end of the power circuit 13 is connected to the positive pole of the first motor 5 through the first interface J4 after sequentially passing through the first inductor L2 and the first diode D2. One end of the filtering capacitor C16 is grounded, and the other end is respectively connected to the output end of the first diode D2 and the first interface J4. Among them, the power output from the power circuit 13 is stabilized and filtered by the first inductor L2, the first diode D2, and the filtering capacitor C16, and then supplied to the first motor 5 through the first interface J4.

The stepless regulation circuit 6 includes a boost chip U3, a first resistor R8, a second resistor R9, a first capacitor C10, and an adjustment resistor 22. The SW pin of the boost chip U3 is connected to the output end of the first inductor L2, the enable pin of the boost chip U3 is electrically connected to MCU 3, the feedback pin of the boost chip U3 is connected to the output end of the first diode D2 through the first resistor R8. One end of the second resistor R9 is grounded, and the other end is connected to the feedback pin of the boost chip U3. The input power pin of the boost chip U3 is grounded through the first capacitor C10 and also electrically connected to the output end of the first diode D2.

The adjustment resistor 22 includes multiple parallel third resistors R3, with one end of which connected to the feedback pin of the boost chip U3 while the other end connected to the output pin of MCU 3. The boost chip U3 receives the electrical signal output by MCU 3 through the enable pin and works according to this electrical signal. MCU 3 selects several third resistors R3 to be electrically connected to the boost chip U3 based on the feedback signal from the stepless regulator J8. The boost chip U3 adjusts the voltage output to the first interface J4 based on the electrical signal input from the feedback pin.

It should be noted here that the output pins of each third resistor R3 connected to the MCU 3 are different. When the user operates the stepless regulator J8, MCU 3 selects several output pins based on the electrical signal input from the stepless regulation circuit 6 and adjusts the feedback signal output to the boost chip U3 through the corresponding third resistor R3. The boost chip U3 adjusts the voltage output to the first interface J4 based on the feedback signal from the third resistor R3, combined with the first resistor R8 and the second resistor R9, to adjust the power output to the first motor 5 and regulate risk.

Specifically, there are 12 third resistors R3, with each being connected to an output pin of MCU 3.

Figure 6:
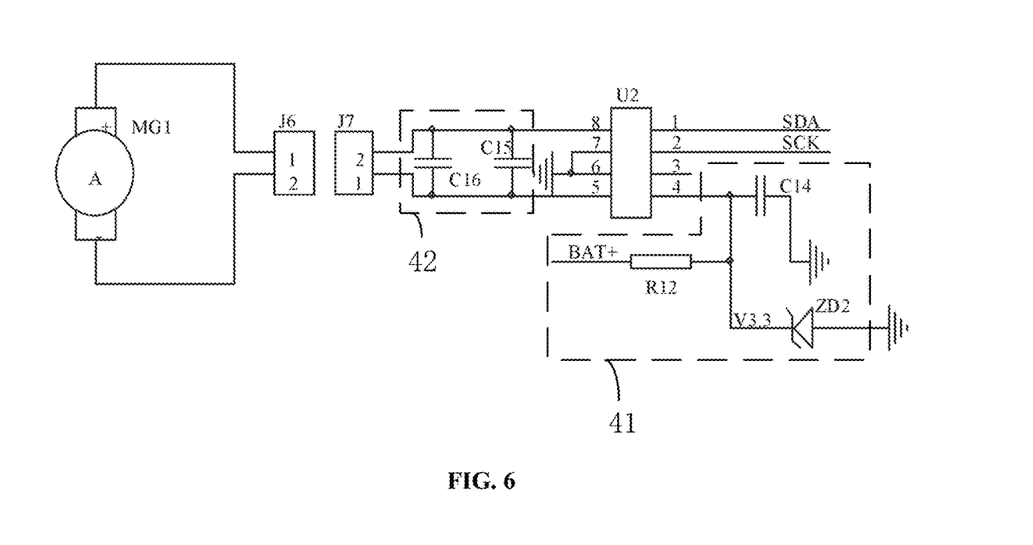
FIG. 6 is a circuit diagram of a second driving circuit of the present disclosure.

In one embodiment, the second driving circuit 4 includes a motor driving chip U2, a first filtering unit 41, a second filtering unit 42, and a second interface J7. The first filtering unit 41 is electrically connected to the output end of the power circuit 13 and the motor driving chip U2, respectively. The first filtering unit 41 is used to filter the voltage output by the power circuit 13 and supply it to the motor driving chip U2. The second filtering unit 42 is electrically connected to the motor driving chip U2 and the second interface J7, respectively. The second interface J7 is electrically connected to the second motor 7. The second filtering unit 42 filters the driving voltage output by the motor driving chip U2 and supplies it to the second motor 7. The sixth and seventh pins of the motor driving chip U2 are grounded, and the SDA and SCK pins on the motor driving chip U2 are electrically connected to MCU 3. The motor driving chip U2 drives the second motor 7 to work through the signal output by MCU 3, enabling the fan head 8 to shake.

In the above embodiment, the motor driving chip U2 can be a chip of model 118S, and the MCU 3 can be a chip of model AD156B.

In one embodiment, the first filtering unit 41 includes a fourth resistor R12, a second capacitor C14, and a second diode ZD2. The output end of the power circuit 13 is connected to the fourth pin of the motor driving chip U2 through the fourth resistor R12. The fourth pin of the motor driving chip U2 is grounded through the second capacitor C14. The positive pole of the second diode ZD2 is grounded while its negative pole is electrically connected to the fourth pin of the motor driving chip U2. The output voltage of the power circuit 13 supplies power to the motor drive chip U2 after the voltage drop of the fourth resistor R12 and the voltage stabilization of the second diode ZD2. The voltage output from the power circuit 13 supplies power to the motor driving chip U2 after passing through the fourth resistor R12 voltage drop and the second diode ZD2 voltage stabilization.

In one embodiment, the second filtering unit 42 includes a third capacitor C15, with one end being electrically connected to the second interface J7 and the eighth pin of the motor driving chip U2, while the other end being electrically connected to the second interface J7 and the fifth pin of the motor driving chip U2. The voltage output by the motor driving chip U2 is filtered by the third capacitor C15 and supplies to the second motor 7 through the second interface J7, preventing noise from affecting the stability of the operation of the second motor 7.

In one embodiment, the encoder is a press switch encoder, and the first switch S2 is a switch on the press switch encoder, and the switch is electrically connected to MCU 3. When the user presses the encoder, the switch on the encoder is about to close. When MCU 3 detects that the switch is closed, it sends a driving signal to the motor driving chip U2 to control the operation of the second motor 7.

Figure 10:
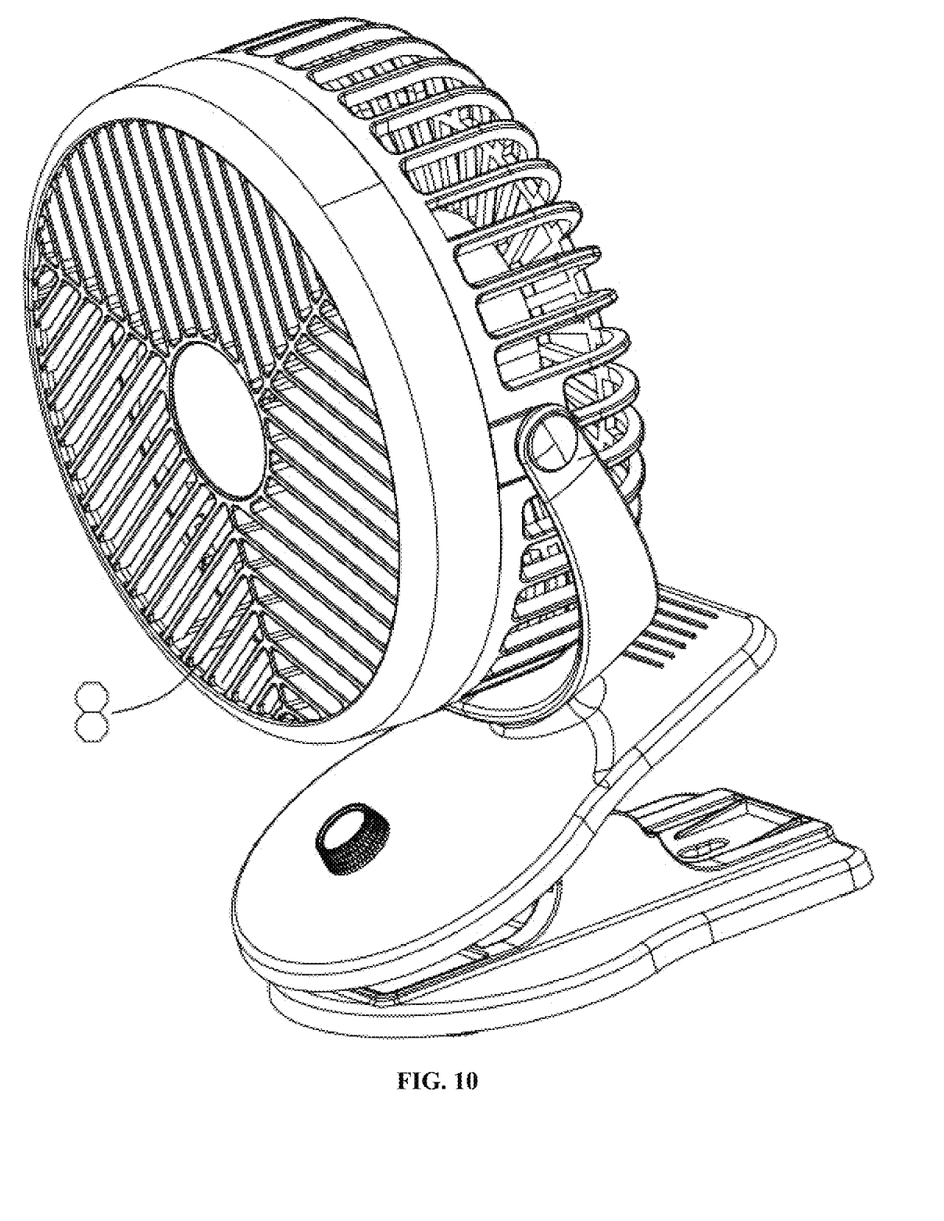
FIG. 10 is a schematic diagram of a fan according to an embodiment of the present disclosure.
Figure 11:
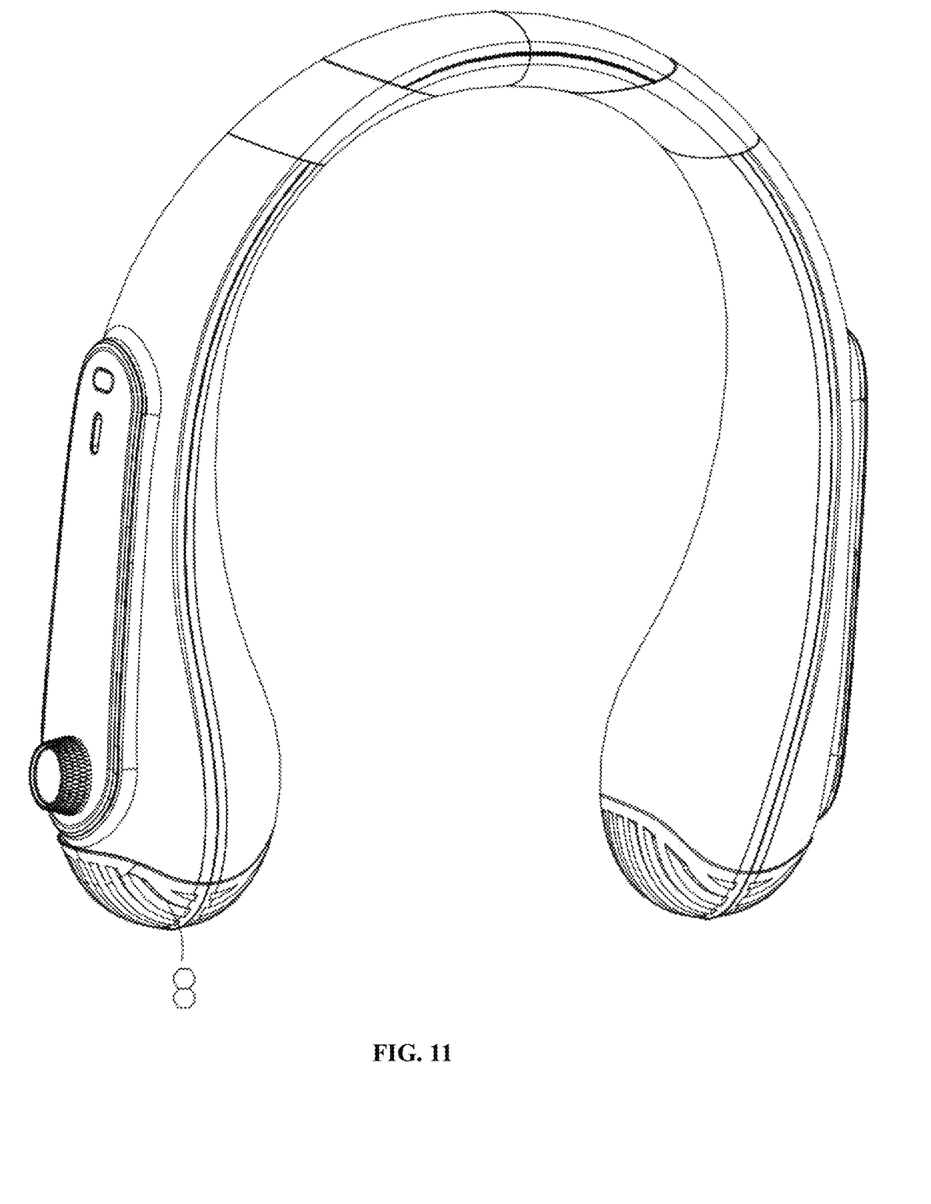
FIG. 11 is a schematic diagram of a fan according to an embodiment of the present disclosure.
Figure 12:
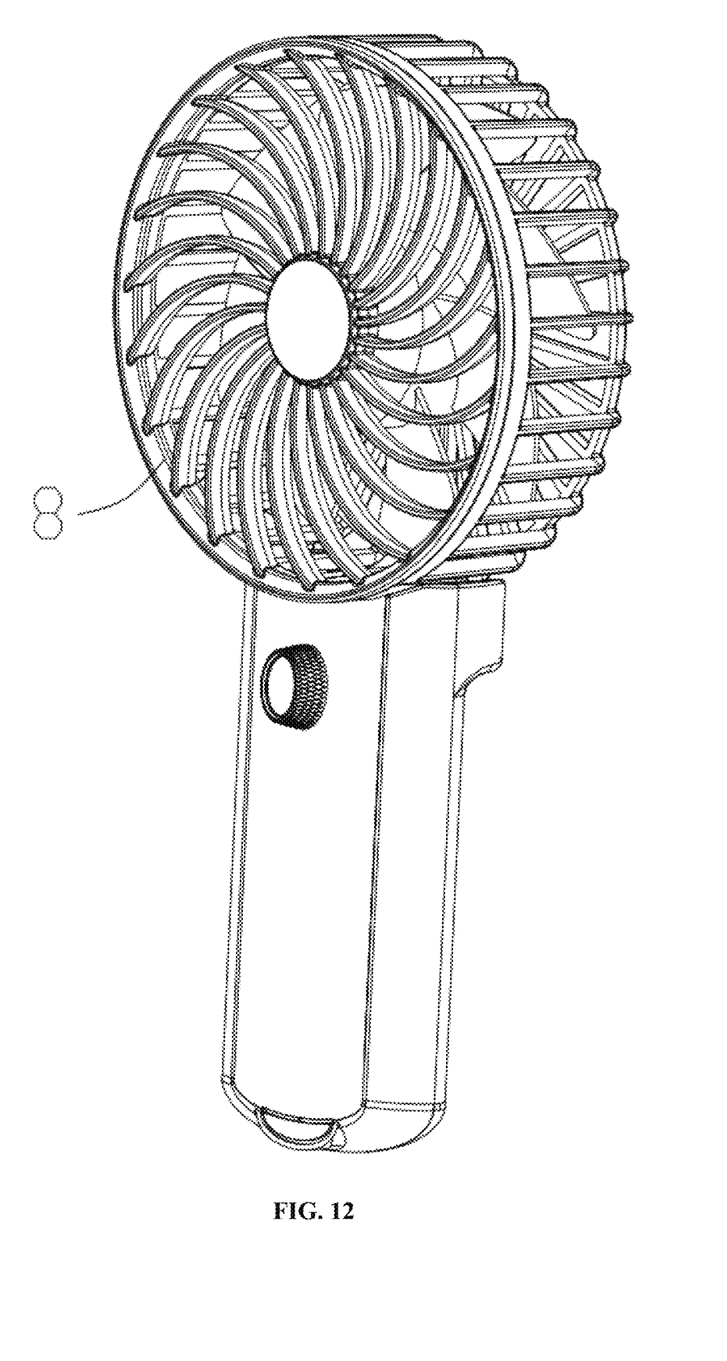
FIG. 12 is a schematic diagram of a fan according to an embodiment of the present disclosure.

In the above embodiment, the control circuit can also be applied to handheld fans (as shown in FIG. 12), clamp fans (as shown in FIG. 10), or in the embodiment without the second motor 7, the control circuit can also be applied to neck fans (as shown in FIG. 1), etc.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, the technical solutions between the various embodiments can be combined with each other, but it must be based on what can be achieved by those of ordinary skill in the art. When the combination of technical solutions is contradictory or cannot be achieved, it should be considered that such a combination of technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A control circuit for a fan, the fan comprising a fan head equipped with a first motor and fan blades connected to the first motor, wherein the control circuit comprises an MCU, a stepless regulation circuit and a first driving circuit both connected to the MCU;

the stepless regulation circuit comprises a stepless regulator for user operation, the first driving circuit is also electrically connected to the first motor, the stepless regulation circuit is configured to send back corresponding electrical signals to the MCU based on the user operation provided on the stepless regulator, and the MCU is configured to control a power output of the first driving circuit to the first motor based on the electrical signal from the stepless regulation circuit, wherein the control circuit further comprises a power module electrically connected to the MCU, the first driving circuit, and the stepless regulation circuit, wherein the first driving circuit comprises a first switching tube and a first interface, the first interface is connected to the first motor; a gate of the first switching tube is connected to the MCU, a source of the first switching tube is grounded; a drain of the first switch is connected to a negative pole of the first motor through the first interface, and an output end of the power module is connected to a positive pole of the first motor through the first interface, wherein the first driving circuit further comprises a first filtering unit, wherein the first filtering unit comprises a first inductor, a first diode, and a filtering capacitor; an output end of the power module is sequentially connected to a positive pole of the first motor through the first interface after passing through the first inductor and the first diode; one end of the filtering capacitor is grounded, and the other end is connected to an output terminal of the first diode and the first interface, respectively;

wherein when the stepless regulator is an encoder, the first driving circuit comprises a boost chip, a first resistor, a second resistor, a first capacitor, and a regulating resistor; a SW pin of the boost chip is connected to an output end of the first inductor, an enable pin of the boost chip is electrically connected to the MCU; a feedback pin of the boost chip is connected to the output end of the first diode through the first resistor, one end of the second resistor is grounded, and the other end is connected to a feedback pin of the boost chip; an input power pin of the boost chip is grounded through the first capacitor and also electrically connected to the output end of the first diode;

the regulating resistor comprises multiple parallel third resistors, wherein one end of the third resistor is connected to the feedback pin of the boost chip, and the other end is connected to an output pin of the MCU; the boost chip receives an electrical signal output by the MCU through an enable pin and works according to the electrical signal; the MCU is configured to select several third resistors to be electrically connected to the boost chip based on a feedback signal from the stepless regulator; the boost chip is configured to adjust a voltage output to the first interface based on the electrical signal input from the feedback pin.

2. The control circuit for a fan according to claim 1, wherein the fan further comprises a second motor for controlling a rotation of the fan head, the control circuit comprising a second driving circuit and a first switch electrically connected to the MCU: the second driving circuit is electrically connected to the power module and the second motor, respectively: the MCU is configured to drive the second motor to work through the second driving circuit based on the electrical signal from the first switch.

3. The control circuit for a fan according to claim 1, wherein the number of the third resistor is 12.

4. A control circuit for a fan, the fan comprising a fan head equipped with a first motor and fan blades connected to the first motor, wherein the control circuit comprises an MCU, a stepless regulation circuit and a first driving circuit both connected to the MCU;

the stepless regulation circuit comprises a stepless regulator for user operation, the first driving circuit is also electrically connected to the first motor, the stepless regulation circuit is configured to send back corresponding electrical signals to the MCU based on the user operation provided on the stepless regulator, and the MCU is configured to control a power output of the first driving circuit to the first motor based on the electrical signal from the stepless regulation circuit, wherein the stepless regulator is a potentiometer or a rotary encoder switch;

wherein the control circuit further comprises a power module electrically connected to the MCU, the first driving circuit, and the stepless regulation circuit, wherein the fan further comprises a second motor for controlling a rotation of the fan head, the control circuit comprising a second driving circuit and a first switch electrically connected to the MCU; the second driving circuit is electrically connected to the power module and the second motor, respectively; the MCU is configured to drive the second motor to work through the second driving circuit based on the electrical signal from the first switch;

wherein the second driving circuit comprises a motor driving chip, a first filtering unit, a second filtering unit, and a second interface; the first filtering unit is electrically connected to an output end of the power circuit and the motor driving chip, and the first filtering unit is configured to filter the voltage output from the power circuit before supplying it to the motor driving chip; the second filtering unit is electrically connected to the motor driving chip and the second interface, and the second interface is connected to the second motor: the second filtering unit is configured to filter the driving voltage output from the motor driving chip before supplying it to the second motor; the sixth and seventh pins of the motor driving chip are grounded, and SDA and SCK pins of the motor driving chip are electrically connected to the MCU.

5. The control circuit for a fan according to claim 4, wherein the first filtering unit comprises a fourth resistor, a second capacitor, and a second diode: an output end of the power circuit is connected to a fourth pin of the motor driving chip through the fourth resistor, and the fourth pin of the motor driving chip is also grounded through the second capacitor: the positive pole of the second diode is grounded, while the negative pole is electrically connected to the fourth pin of the motor driving chip.

6. The control circuit for a fan according to claim 5, wherein the second filtering unit comprises a third capacitor, one end of the third capacitor is electrically connected to both a second interface and a eighth pin of the motor driving chip, while its other end is connected to both the second interface and the fifth pin of the motor driving chip.

7. He control circuit for a fan according to claim 2, wherein the encoder is a press switch encoder, and the first switch is the switch on the press switch encoder.

8. The control circuit for a fan according to claim 1, wherein the power module comprises a power input interface and a power circuit electrically connected to the power input interface: the power circuit is electrically connected to the MCU, the first driving circuit, the second driving circuit, and the stepless regulation circuit.

9. The control circuit for a fan according to claim 8, wherein the power module further comprises a battery electrically connected to the power circuit; the power circuit is a charging and discharging circuit used for charging the battery with a power input from a power interface.

10. The control circuit for a fan according to claim 9, wherein the power module further comprises a battery protection circuit electrically connected to both the power circuit and the battery: the battery protection circuit is configured to stop charging the battery during overcharging and prevents the battery from continuing to output voltage during excessive discharge.

11. The control circuit for a fan according to claim 10, wherein the control circuit further comprises a power indication circuit electrically connected to the MCU: the power circuit provides a feedback signal to the MCU when the power is connected to the power interface, and the MCU controls the power indication circuit based on the feedback signal from the power circuit.

12. A control circuit for a fan, the fan comprising a fan head equipped with a first motor and fan blades connected to the first motor, wherein the control circuit comprises an MCU, a stepless regulation circuit and a first driving circuit both connected to the MCU;

the stepless regulation circuit comprises a stepless regulator for user operation, the first driving circuit is also electrically connected to the first motor, the stepless regulation circuit is configured to send back corresponding electrical signals to the MCU based on the user operation provided on the stepless regulator, and the MCU is configured to control a power output of the first driving circuit to the first motor based on the electrical signal from the stepless regulation circuit, wherein the control circuit further comprises a power module electrically connected to the MCU, the first driving circuit, and the stepless regulation circuit, wherein the power circuit comprises a charging and discharging chip, a fifth resistor, a fourth capacitor, and a fifth capacitor: the second pin of the charging and discharging chip is grounded through the fifth resistor, the fourth pin of the charging and discharging chip is grounded through the fourth capacitor, and the fifth pin of the charging and discharging chip is grounded through the fifth capacitor; the positive pole of the battery is electrically connected to the fifth pin of the charging and discharging chip, and the seventh pin of the charging and discharging chip is connected to the MCU for temperature monitoring of MCU.

13. The control circuit for a fan according to claim 12, wherein the battery protection circuit comprises a battery protection chip, a sixth capacitor, and a sixth resistor, a first pin of the battery protection chip is connected to the third pin of the battery protection chip through the six resistor, and the third pin of the battery protection chip is connected to the fifth pin of the charging and discharging chip through the sixth resistor; the second pin of the battery protection chip is connected to its first pin, and this second pin is also connected to the negative pole of the battery: the fourth and fifth pins of the battery protection chip are grounded.

14. The control circuit for a fan according to claim 13, wherein the power interface is a Type-C interface.

15. The control circuit for a fan according to claim 14, wherein the MCU is a model AD156B chip.

* * * * *